United States Patent [19]

Shigeta et al.

[11] Patent Number: 5,394,204
[45] Date of Patent: Feb. 28, 1995

[54] PROJECTION TYPE IMAGE DISPLAY DEVICE

[75] Inventors: Teruaki Shigeta, Neyagawa; Takeshi Nishiura, Hirakata, both of Japan

[73] Assignee: Matsushita Electric Industrial Co., Ltd., Osaka, Japan

[21] Appl. No.: 110,551

[22] Filed: Aug. 23, 1993

[30] Foreign Application Priority Data

Aug. 21, 1992 [JP] Japan .................................. 4-222448

[51] Int. Cl.6 .............................................. G03B 21/00
[52] U.S. Cl. ......................................... 353/31; 353/37; 353/94
[58] Field of Search ......................... 353/31, 33, 37, 94; 359/48, 49, 40

[56] References Cited

U.S. PATENT DOCUMENTS

| | | | |
|---|---|---|---|
| 4,882,617 | 11/1989 | Vriens | 353/49 |
| 4,912,614 | 3/1990 | Goldenberg | 353/31 |
| 4,969,730 | 11/1990 | van den Brandt | 353/31 |
| 5,135,300 | 8/1992 | Toide et al. | 353/31 |
| 5,255,082 | 10/1993 | Tamada | 353/31 |

FOREIGN PATENT DOCUMENTS 0262822  11/1987  Japan ................................. 359/48

*Primary Examiner*—William A. Cuchlinski, Jr.
*Assistant Examiner*—William C. Dowling
*Attorney, Agent, or Firm*—Ratner & Prestia

[57] ABSTRACT

A projection type image display device comprises plural light sources, optical converging systems, liquid crystal display elements, a color synthesizing system and a optical projection system.

8 Claims, 8 Drawing Sheets

PROJECTION TYPE IMAGE DISPLAY DEVICE

FIELD OF THE INVENTION

This invention relates to a projection type image display device comprising light sources, and light valves which include liquid crystal display elements of blue, green, and red colors, through which an image is passed and projected onto a screen to display a color image.

BACKGROUND OF THE INVENTION

As a display means of a large-sized image, various projection type image display devices using liquid crystal elements have been developed recently. In addition, image display devices employing cathode ray tubes have been used. An example of such a display device is described in "LCD Full-Color Video Projection", Society for Information Display, Digest 1986, PP. 375–378 which is incorporated herein by reference. The structure of the display device is shown in FIG. 9. As is shown, the light emitted by the halogen lamp 51, after being polarized by reflector 52 and condenser lens 53, is separated into light of red color, green color, and blue color by dichroic mirrors 54 and 55, and is projected onto the respective liquid crystal display elements 60, 61, and 62 for red, green and blue. The green light is projected directly onto its corresponding display element while the red and blue color lights are projected onto their corresponding display elements after being reflected by mirrors 56, 57, 58, and 59. The liquid crystal display elements 60, 61, and 62 each consist of plural picture elements whose light transmissivities are controlled electrically and optically according to an image signal (not shown) from the outside to act as light shutters and to form an image. The images are synthesized by a dichroic prism 63 enlarged and projected onto a screen 65 by a projection lens 64 to produce a colored large image.

A similar projection type image display device is disclosed in the specification of Open-laying gazette No. Hei3-291644 of Japanese patent application. In the device, white light from a source is divided into color light by an inclined type dichroic mirror for blue and green, controlled in strength by a light valve, synthesized and projected.

As the light source for such a projection type display device with liquid crystal elements, short arc type xenon lamps or metal halide lamps as well as halogen lamps are generally used. In recent times, metal halide lamps have been employed frequently due to their superior characteristics with regard to geometrical compactness, favorable spectrum generation and high efficiency.

In a projection type image display device with only one light source, the white light emitted by the light source is divided into red, green, and blue lights by a light analyzing system of a dichroic mirror or dichroic prism, projected onto liquid crystal display elements, and synthesized by a color-synthesizing optical system. The necessity for both the color analyzing system and color synthesizing system has been an obstacle for reduction of size and cost of the conventional devices.

Also, the image display device having a metal halide lamp as its light source exhibits disadvantageous color shift. A metal halide lamp including metal elements emitting a few strong line spectrum (such as Tl, Li, or In) and metal elements emitting a few weak line spectrum as well as a few strong line spectrum (such as Dy, Nd, Ho, or Tm) are known to have a ratio of light emission which varies as time passes during long periods of operation. For example a metal halide lamp including TlI, LiI, and InI suffers, after about 800 hours of operation, variation of color due to change of strength ratio of red, green, and blue lights. One report has noted a particular decrease of red light.

Further, to coincide the chromaticity of a projected color image with a specified standard, the amounts of metal elements in the lamp and the optical properties of the optical parts (the dichroic mirror, for example) combined with the lamp had to be designed with extreme care, since the chromaticity of the lamp with several metals is not adjustable at will.

Furthermore, the power efficiency of the conventional system was low, because the excessively strong part of the light spectrum is desireably suppressed to obtain a desired chromaticity in concert with the weak part of the light spectrum.

On the other hand, projection type liquid crystal display devices with so called single-plate-type liquid crystal have been developed, which are provided with color filters for red, green, and blue for the picture elements. In such a liquid crystal display device, however, the red light-transmitting picture element, for example, utilizes red light only from the white light of the source. The situation is similar for the green or blue light-transmitting elements. Thus, the efficiency of light utility was very low and insufficient for high luminance or high quality.

There has been disclosed a display device to overcome the above described defects in the Japanese Patent Open-laying Gazette No. Hei3-56922 is shown in FIG. 10. The light source of the device consists of three cathode ray tubes 66, 67, and 68 each emitting red, green, and blue light respectively. The red, green, and blue lights are made parallel by a condenser lens 69 and projected onto a liquid crystal display element 71 through a microlens array 70. The liquid crystal display element 71 functions as an optical shutter to change the transmittance of each picture element in accordance with the outer signal, and provides a color image, which is enlarged on a screen 73 by a projection lens 72. This device having CRTs 66, 67, and 68 of single color as the light source can have red, green, and blue lights without energy loss due to unbalance between the light sources. To obtain a projected image with more precision and of high luminance, however, the number of picture elements and the luminance of CRTs is desireably increased.

SUMMARY OF THE INVENTION

A projection type image display device comprises: light sources, optical converging systems which converge the lights projected by the light sources, liquid crystal display elements for red, green and blue color which control the light from the converging systems, a color synthesizing optical system which synthesizes the lights from the liquid crystal display elements, and an optical projection system which projects the optical image formed by the liquid crystal elements onto a screen. The light sources emit lights of a specified spectral bands which are different from each other.

With this structure, the liquid crystal display elements for red, green, and blue colors are illuminated by the light sources for red, green, and blue color respectively, forming images of each color on the liquid crystal display elements. These color images are synthesized by the color-synthesizing system and projected by the optical projection system onto the screen, producing superior images having high luminance and good color reproducibility. As the strength of each red, green, and blue light can be individually adjusted, desireable chromaticity is obtained. Further, each light source is operated with power input corresponding to the necessary light output, so that the loss of electric power due to suppression of excessively strong parts of the light spectrum is avoided.

DETAILED EXPLANATION OF EMBODIMENTS

Figure 1:
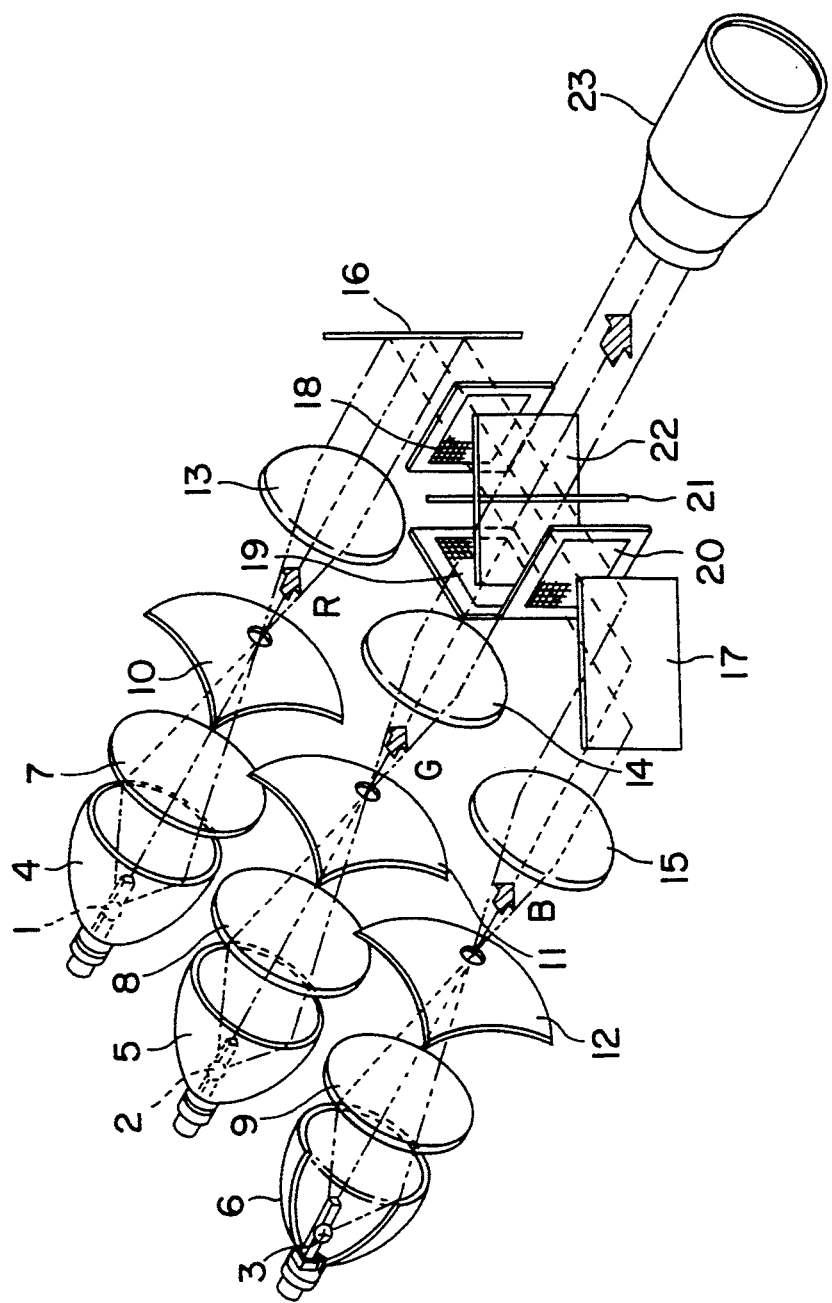
FIG. 1 is a perspective view showing the structure of a projection type image display device according to the first exemplary embodiment of the present invention.
Figure 2:
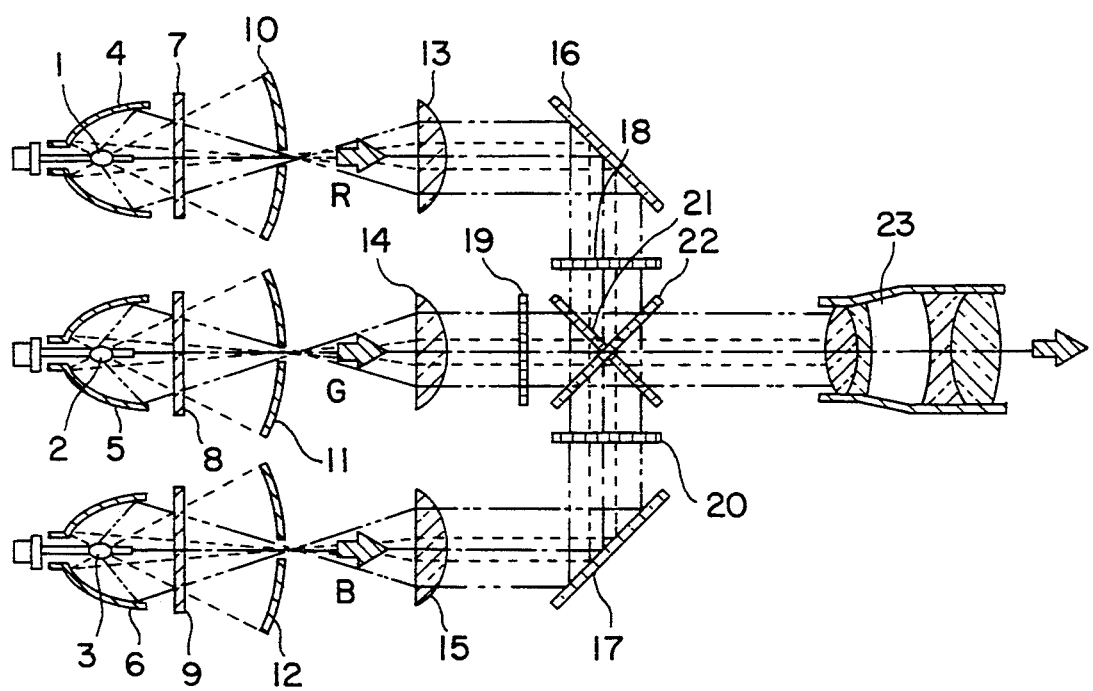
FIG. 2 is a section showing the structure of a projection type image display device according to the first exemplary embodiment of the present invention.

Now, referring to the drawings, exemplary embodiments of the present invention are explained as follows:

Referring to FIG. 1 and FIG. 2, a projection type image display device of the first exemplary embodiment of the present invention comprises point light sources consisting of three metal halide lamps 1, 2, and 3, emitting lights of red, green, and blue color respectively. The metal halide lamps 1, 2, and 3 provided with elliptic reflectors 4, 5, and 6 having elliptic section to produce converged lights.

The device then comprises visible-light filters 7, 8, and 9, which cut off the infra-red and ultra-violet rays in the lights from the light source and reflectors, to pass visible lights only.

The device is further provided with spherical reflectors 10, 11, and 12 having a circular aperture at each optical axis. Reflectors 10, 11, and 12 are placed so that each center coincides with each first focus of elliptic reflectors 4, 5, and 6 and the apertures being at each second focus. The condenser lenses 13, 14 and 15 are placed next to the reflectors 10, 11, and 12 on the optical axis with the focuses at the second focuses of the elliptic reflectors 4, 5, and 6 to make the lights parallel. Thus, elliptic reflectors 4, 5, and 6, visible-light filters 7, 8, and 9, spherical reflectors 10, 11, and 12, and condenser lenses 13, 14, and 15 forms an optical converging system.

The mirrors 16 and 17 refract 90° the parallel light from the condenser lenses 13 and 15. The liquid crystal display elements 18, 19, and 20 for red, green, and blue lights with plural picture elements control the passage of each light according to the image signal from outside to form an optical image. Two dichroic mirrors 21 and 22 cross perpendicularly. Dichroic mirrors 21 and 22 reflect the red color light and blue color light from the liquid crystal display elements 18 and 20, while both reflectors pass the green light from the element 19, to form a synthesized optical image and transfer it to a projection lens 23 which projects the desired image onto a screen.

The metal halide lamp 1 for red color comprises a quartz tube involving lithium iodide as well as mercury and rare gas xenon. Metal halide lamp 2 for green light has a quartz tube containing thallium iodide as well as mercury and Xe. Metal halide lamp 3 for blue light includes a quartz tube with indium iodide, mercury and Xe. The metal halide lamp 1 for red color may also include mercury, rare gas, and halogenide including lithium halogenide. The metal halide lamp 2 may also include mercury, rare gas and halogenide including thallium halogenide. The metal halide lamp 3 for blue light may also include mercury, rare gas and halogenide including indium halogenide. The electric power for the lamps may be 35 W.

Figure 3A:
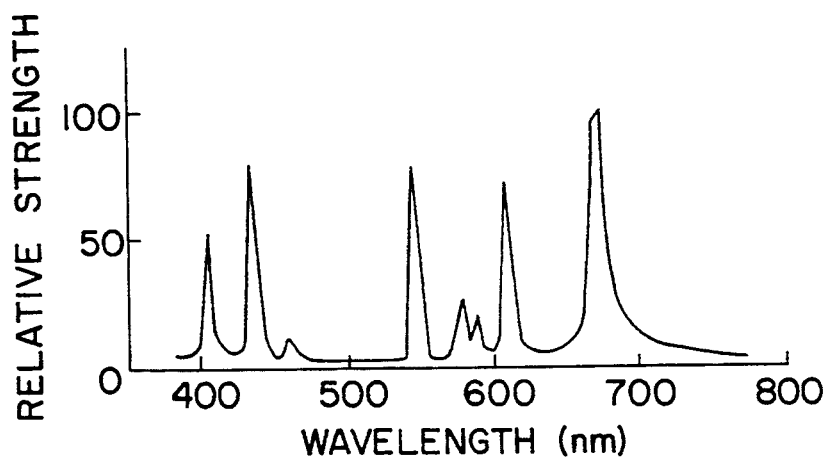
FIGS. 3(a)-(c) are graphs showing the spectral distribution of the light emitted by a metal halide lamp for the projection type image display device.
Figure 3B:
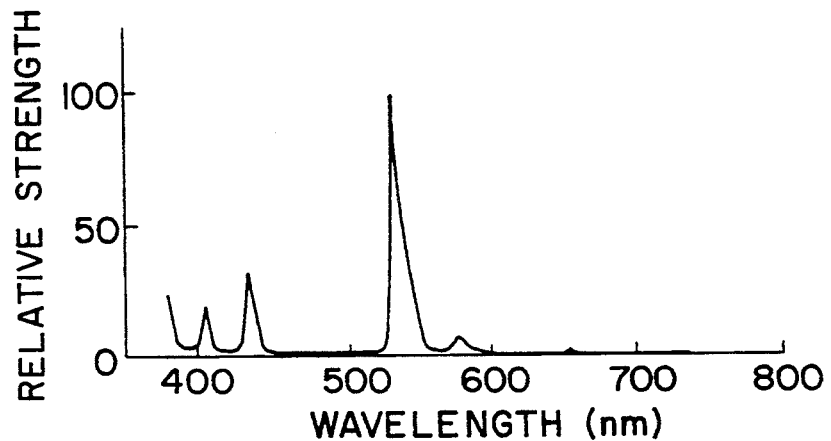
Figure 3C:
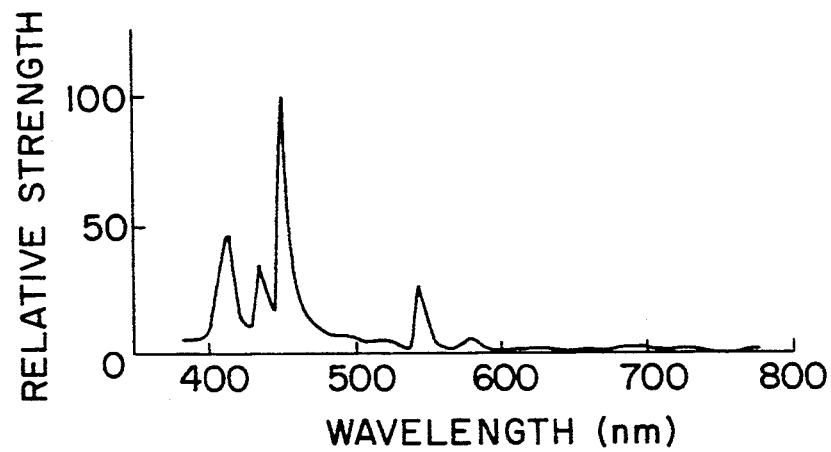

The spectral distribution of the lights of these lamps are shown in FIG. 3(a), (b), and (c), for red-color lamp 1, green-color lamp 2, and blue-color lamp 3, respectively. As is observed, the dominant wave lengths of these lamps are 600 to 680 nm, 500 to 580 nm, and 400 to 480 nm, respectively.

These metal halide lamps 1, 2, and 3 are placed at the first focuses of elliptic reflectors 4, 5, and 6, respectively, and the lights emitted by these lamps proceed, partially directly and partially once reflected by the elliptic reflectors 4, 5, and 6, to the visible-light filters 7, 8, and 9. With infrared rays and ultraviolet rays eliminated, visible lights only are focused at the second focuses of the elliptic reflectors or the apertures of the spherical reflectors 10, 11, and 12.

Among the lights emitted by the lamps 1, 2, and 3, some parts proceed, after having their IR and UV contents removed by the visible-light filters 7, 8, and 9, to the spherical reflectors 10, 11, and 12 and are reflected there, and, passing the metal halide lamps 1, 2, and 3, or their visinities, are reflected by the elliptic reflectors 4, 5, and 6 to be focused at the second focuses.

The lights focused at the second focuses are made parallel by the condenser lenses 13, 14, and 15, and proceed to the liquid crystal display elements 18, 19, and 20, with red and blue lights reflected by the reflectors 16 and 17, and green light directly. The liquid crystal display elements 18, 19, and 20 have the transmittances of their many picture elements varied electrically in accordance with the signal from outside, forming images of each color on them.

The optical images of each color formed on the liquid crystal display elements are synthesized by the crossing dichroic mirrors 21 and 22, and the synthesized image is projected by a projection lens 23 onto a screen (not shown) of 20 to 100 inch diagonal to obtain a large color image.

Figure 4A:
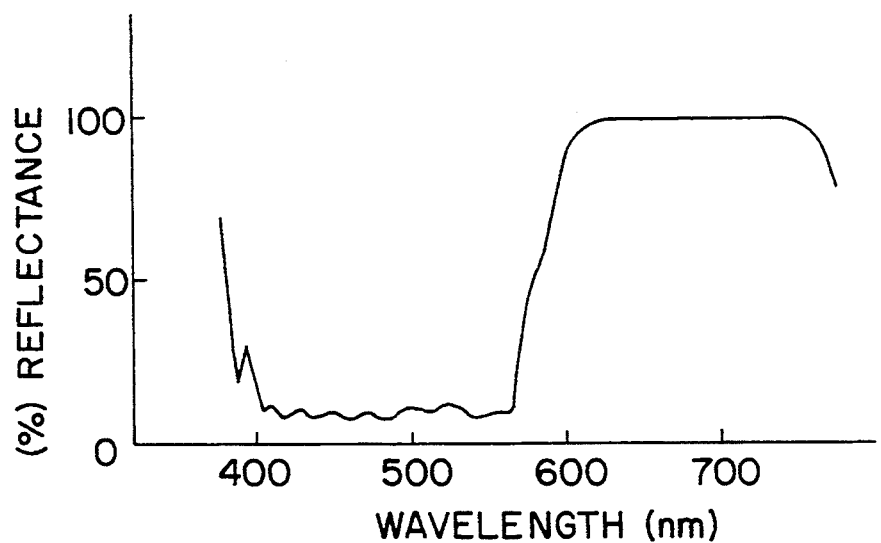
FIGS. 4(a)-(b) are graphs showing spectral reflectance of a dichroic mirror for the projection type image display device.
Figure 4B:
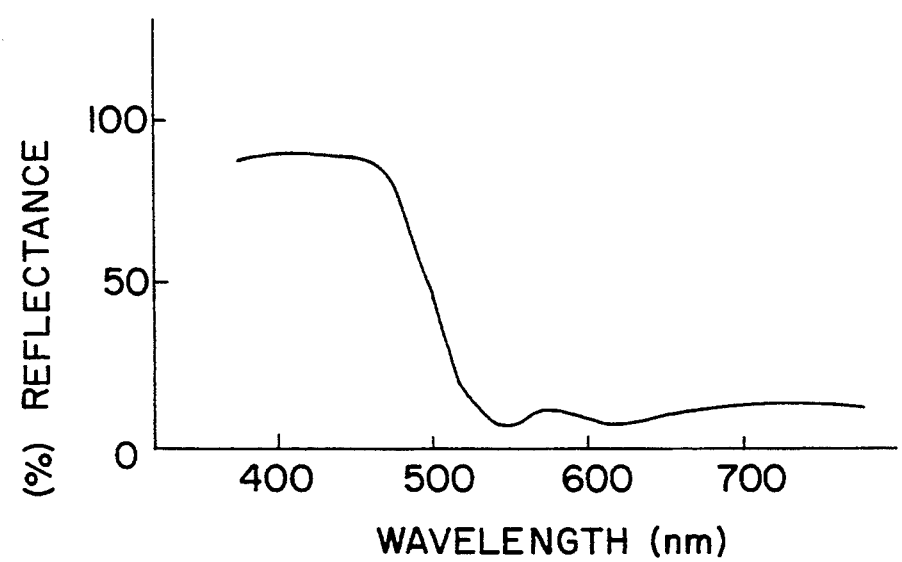

The dichroic reflectors 21 and 22 are red-color-light reflecting and blue-color-light reflecting and their spectral reflectance characteristics are shown in FIG. 4(a) and FIG. 4(b), respectively.

Figure 5:
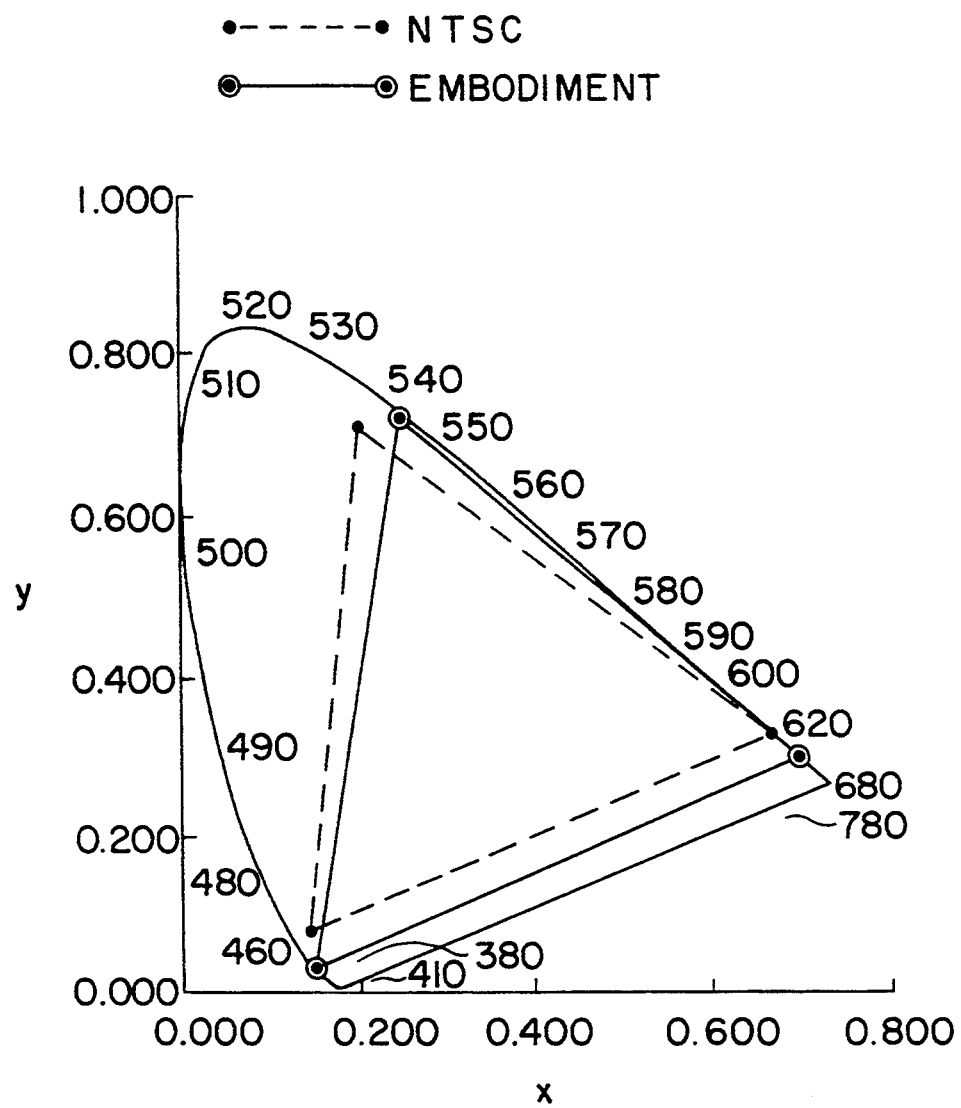
FIG. 5 is a diagram of chromaticity characteristics of the projection type image display device of the first exemplary embodiment of the present invention compared with the NTSC standard range of television.

With the above described structure, a representable range on a chromaticity diagram is shown by the solid triangle in FIG. 5. The standard range for television by NTSC is shown by the dotted triangle in FIG. 5. This demonstrates that the representable range of the device of the present invention is satisfactory.

While the lamps in the above embodiment are of 35 W type each, they can be varied individually, or the voltage or frequency of operation may be changed to obtain the best white balance in the synthesized image.

Thus, according to an exemplary embodiment of the present invention, three metal halide lamps, lamp 1 for red color with dominant wave length 600 to 680 nm, lamp 2 for green color with dominant wave length 500 to 580 nm and lamp 3 for blue color with dominant wave length 400 to 480 nm are provided. The red, green, and blue color lights are projected to the corresponding liquid crystal display elements 18, 19, and 20 to be synthesized, by the synthesizing system, so that the color analyzing system of the conventional devices becomes unnecessary. In this manner, a simple, small, and inexpensive device may be realized.

Further, as the light output of red, green, and blue metal halide lamps 1, 2, and 3 can be adjusted individually, a chromaticity variation in operation of the conventional device due to the color shift of the lamps can be alleviated, satisfactory chromaticity can be obtained, and power supply efficiency can be realized.

For example, if the red color lamp had its output reduced compared with the other two color lamps resulting in change of chromaticity, the adjustment of only the red color lamp will bring the appropriate image.

Figure 6:
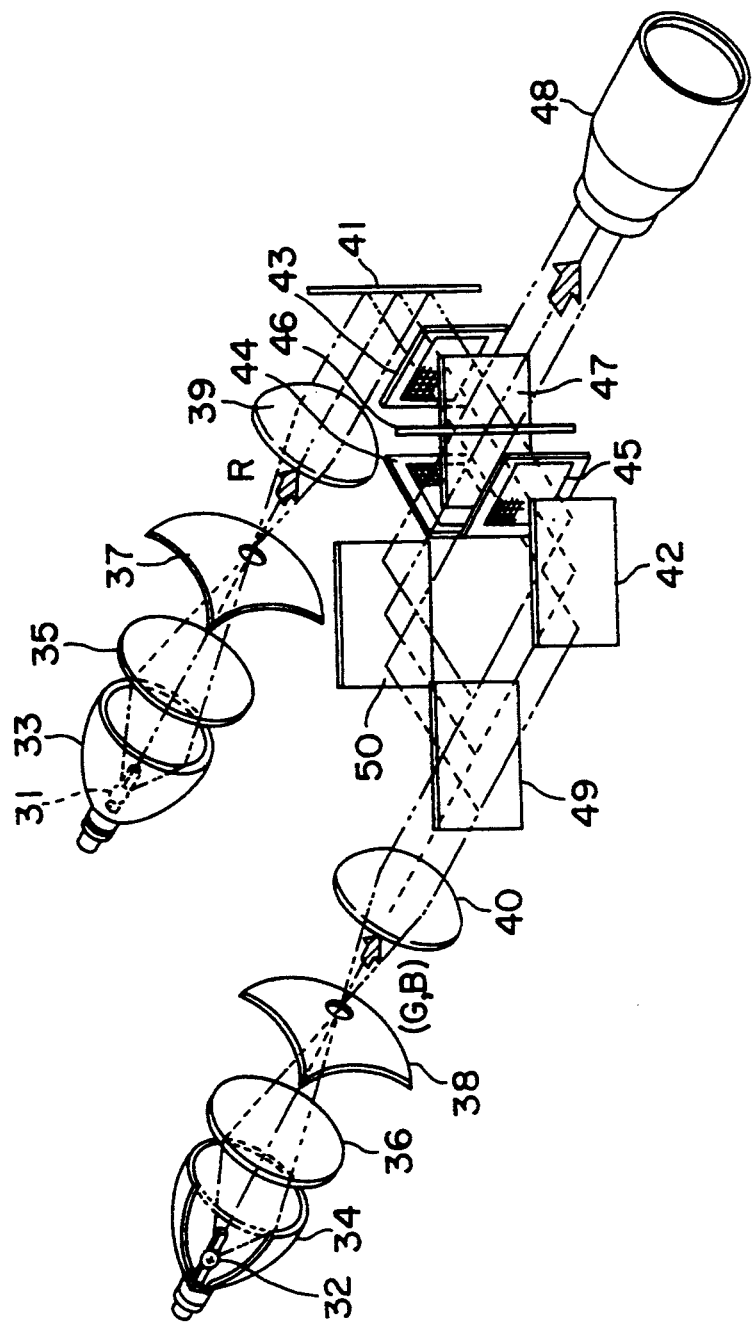
FIG. 6 is a perspective view showing the structure of a projection type image display device according to the second exemplary embodiment of the present invention.

Referring to FIG. 6, the second exemplary embodiment of the present invention is explained. This device comprises elements and structures similar to those of the first embodiment, but has a lamp emitting a light with two dominant wave lengths instead of two lamps with single dominant wave length and corresponding optical system.

Figure 7:
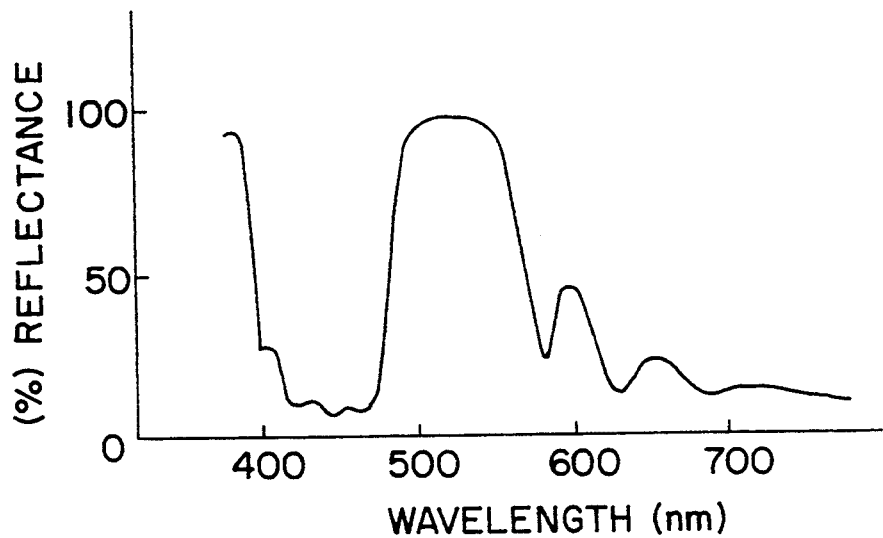
FIG. 7 is a graph showing spectral reflectance of a dichroic mirror for the projection type device.

The projection type image display device embodying the invention comprises a metal halide lamp 31 emitting red light and a metal halide lamp 32 emitting both green and blue lights. A dichroic mirror 49 divides the mixed green and blue light from a condenser lens 40 reflecting green light and passing blue light. The spectral reflectance characteristic of the dichroic mirror is shown in FIG. 7.

Figure 8:
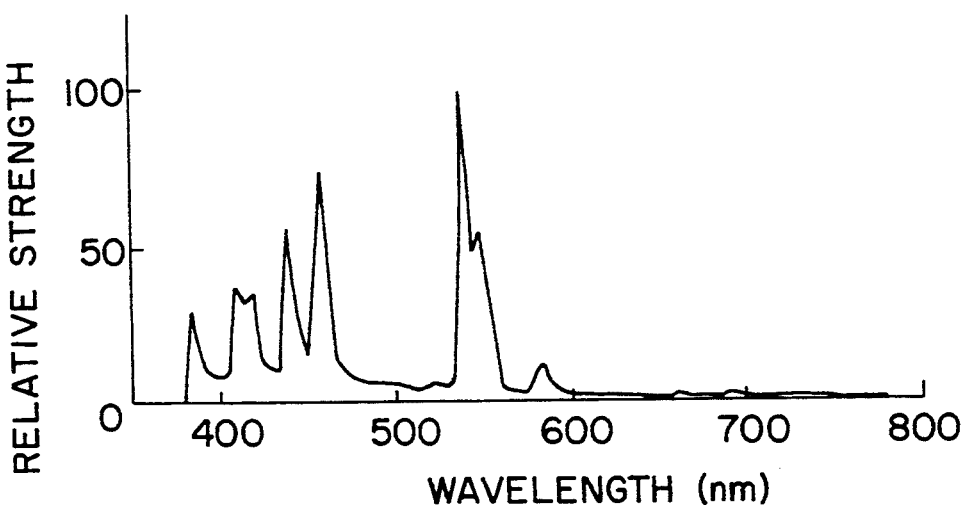
FIG. 8 is a graph showing spectral distribution of the light emitted by a lamp with two dominant wave lengths employed for the second exemplary embodiment of the invention.
Figure 9:
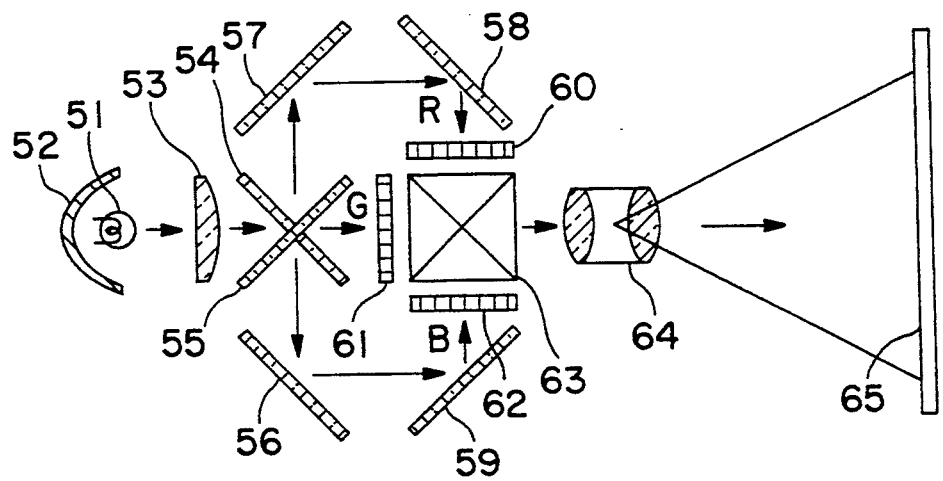
FIG. 9 is a sectional view of a conventional projection type image display device.
Figure 10:
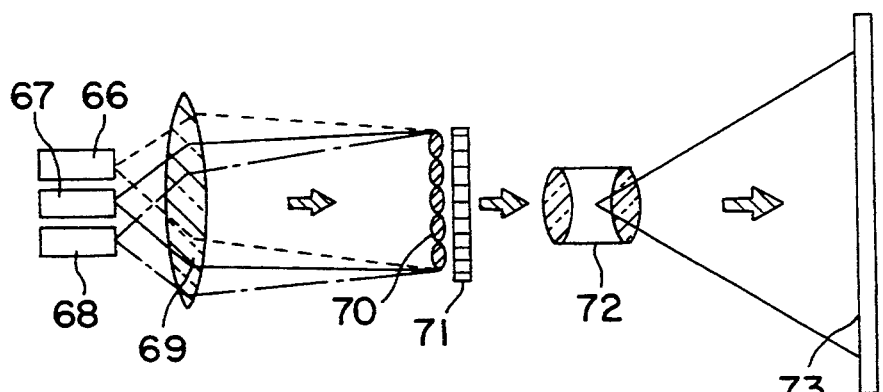
FIG. 10 is a sectional view of another conventional projection type image display device.

The metal halide lamp 31 emitting red light involves a discharge tube of quartz glass with electrodes on its both ends containing a metal halide of lithium and iodine as well as mercury and xenon, and the discharge tube of the lamp 32 emitting green and blue light is sealed with metal halides of thallium, indium, and iodine in addition to mercury and xenon. The spectral distribution of the light of the lamp 31 with dominant wave length 600 to 680 nm is shown in FIG. 3(a), and that of the lamp 32 is given in FIG. 8, showing two dominant wave lengths 500 to 580 nm and 400 to 480 nm.

These metal halide lamps 31 and 32 are placed at the first focuses of elliptic reflectors 33 and 34 respectively. Accordingly, the parts of the lights emitted by the lamps 31 and 32 are reflected by the elliptic reflectors 33 and 34, have their IR and UV rays removed by the visible light filters 35 and 36, and are focused at the second focuses of the reflectors 33 and 34 or the apertures of the spherical mirrors 37 and 38. Also, other parts of the light emitted by the lamps 31 and 32 are, after removing of IR and UV lights by visible light filters 35 and 36, reflected by the spherical reflectors 37 and 38, pass the lamps 31 and 32 and their vicinities, are reflected by the elliptic reflectors 33 and 34, and are focused at the second focuses. The lights which are thus converged are made parallel by the condenser lenses 39 and 40. The red light, after reflection by mirror 41, proceeds to the liquid crystal display element for red color 43. The green and blue lights are divided to green light and blue light by the dichroic mirror 49, with the green light being reflected and the blue light being passed, and the green light proceeds, reflected by mirror 50, to the liquid crystal display element for green light 44, while the blue light proceeds, after reflection by mirror 42, to the liquid crystal display element for blue light 45.

Thus on the liquid crystal display elements 43, 44, and 45 with incident light of red, green, and blue from the condenser lenses 39 and 40, images of red, green, and blue color are formed respectively. These images of color on the elements 43, 44, and 45 are synthesized by the dichroic mirrors 46 and 47 arranged perpendicularly and projected by the projection lens 48 onto the screen of 20 to 100 inch diagonal realizing a large colored image.

Thus, according to the second embodiment, a metal halide lamp for red color having dominant a wave length of 600 to 800 nm, and a metal halide lamp for green and blue light color having dominant wave lengths of 500 to 580 nm and 400 to 480 nm are individually provided and red, green, and blue lights are projected onto the liquid crystal display elements 43, 44, and 45, with the red light directly and green and blue lights through color analysing system, and synthesized by the synthesizing system, so that the optical systems are simplified and are made smaller and more inexpensive.

Also, compared with the first embodiment, the second embodiment has the number of converging optical system including the metal halide lamp and accompanying lighting circuit reduced. The lamps emitting two color light may include in its discharge tube halogenide of lithium and thallium for red and green lights, halogenide of lithium and indium for red and blue lights, and halogenide of thallium and indium for green and blue lights.

Further, as the electric power consumed in the metal halide lamps 31 and 32 are adjusted individually in accordance with the optimum RGB ratio, the chrominance variation in operation is reduced, resulting in the most favourable chrominance characteristic and efficient power distribution.

Instead of the combination of lamps with one and two colors of the second embodiment, other combinations are possible. For example, a metal halide lamp of green color only and another lamp for red and blue light, the latter being realized by enclosing lithium and indium and iodine with mercury and xenon, or a metal halide lamp of blue color only and the second lamp for red and green light with lithium and thallium and iodine in addition to mercury and xenon is possible. They are selected depending on the necessary ratio of intensity ratio of each red, green and blue color.

Furthermore, instead of the metal halide lamps with single or double color combined in the first and second embodiments, other combinations of light sources with a metal halide lamp is possible: for example, combination of metal halide lamps of single color for green and blue lights and a halogen lamp or light emitting diode for red color, or combination of LED for red color, halogen lamp for green light and a metal halide lamp of single color emission for blue light. With a halogen lamp or LED as the light source, lighting circuit is simplified and the optical converging system can be made small.

What is claimed:

1. A projection type image display device comprising:
   a plurality of light sources including metal halide lamps for projecting a red color light, a green color light, and a blue color light,
   optical converging means for converging the light projected by said plurality of light sources,
   a liquid crystal display element for red color, a liquid crystal display element for green color, and a liquid crystal display element for blue color, each display element for controlling the transmission of collimated light from the converging means,
   a color synthesizing optical system which synthesizes light from each of said liquid crystal display element to form an optical image having a chromaticity level,
   an optical projection system which projects the optical image formed by said liquid crystal elements onto a screen, and
   means for individually adjusting the strength of each of said green color light, said red color light, and said blue color light to adjust said chromaticity level of the optical image;
   wherein each one of said plurality of light sources emits light of a specified spectral band which is different from the specified spectral band of each other one of said plurality of light sources.

2. The projection type image display device of claim 1, wherein said red color light, said green color light, and said blue color light have respective dominant wave lengths in ranges of 600 to 680 nm, 500 to 580 nm, and 400 to 480 nm.

3. The projection type image display device of claim 2, wherein the ratio of power consumption for each of the plurality of light sources corresponds to the ratio of light emission of the red, green, and blue lights.

4. The projection type image display device of claim 2, wherein the red color metal halide lamp comprises mercury, rare gas, and halogenide including lithium halogenide, the green color metal halide lamp comprises mercury, rare gas, and halogenide including thallium halogenide, and the blue color metal halide lamp comprises mercury, rare gas, and halogenide including indium halogenide.

5. The projection type image display device of claim 1, wherein said plurality of light sources includes two light sources, one of which emits light of one of red, green, and blue colors having dominant wave lengths between 600 to 680 nm, 500 to 580 nm, and 400 to 480 nm respectively.

6. The projection type image display device of claim 5, wherein the ratio of power consumption of the two light sources corresponds to the ratio of light intensity of the sources.

7. The projection type image display device of claim 5, wherein the lamp emitting two color light includes in its discharge tube one of (a) halogenide of lithium and thallium for red and green lights, (b) halogenide of lithium and indium for red and blue lights, and (c) halogenide of thallium and indium for green and blue lights.

8. The projection type image display device of claim 1, further including chromaticity measuring means for measuring the chromaticity level of the optical image and wherein the strength of each of the green color light, the red color light, and the blue color light is individually adjusted in response to the measured chromaticity level.

* * * * *